Feb. 17, 1942.  R. H. NELSON ET AL  2,273,724
BOMB-CARRYING AIRPLANE
Filed Nov. 8, 1939  3 Sheets-Sheet 1

Richard H. Nelson
Richard L. Stith   Inventors
Thomas A. Endres

By Charles L. Reynolds
Attorney

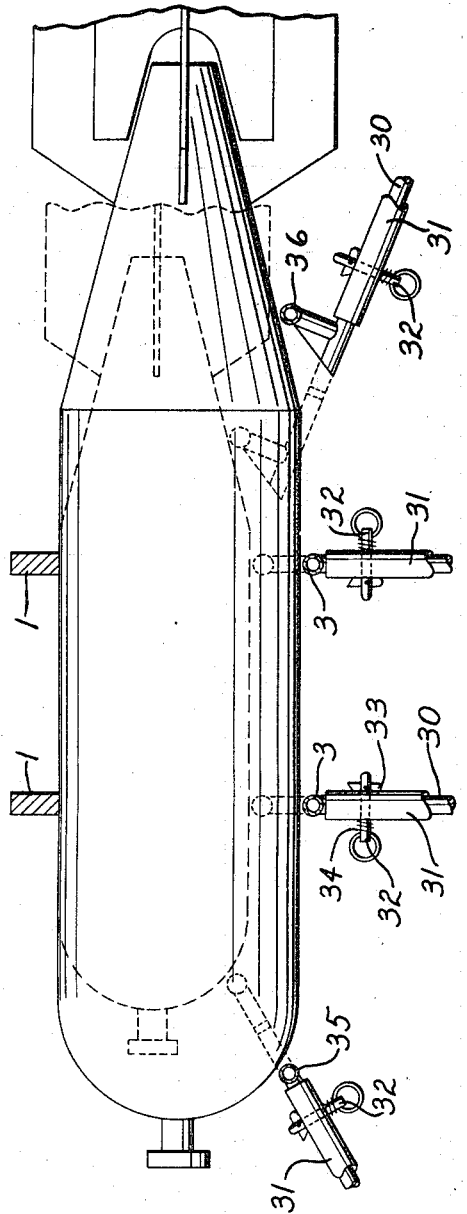
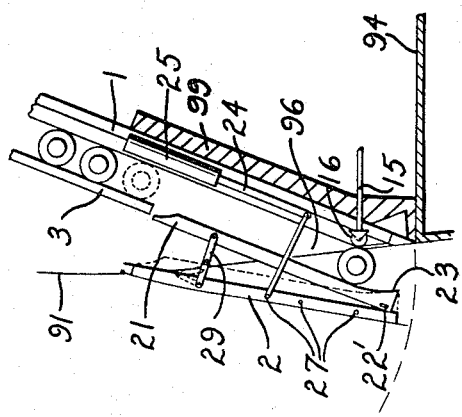
Fig. 3
Fig. 4
Richard H. Nelson
Richard L. Stith
Thomas A. Endres Patented Feb. 17, 1942

2,273,724

UNITED STATES PATENT OFFICE 2,273,724

BOMB-CARRYING AIRPLANE

Richard H. Nelson, Richard L. Stith, and Thomas A. Endres, Seattle, Wash., assignors, by mesne assignments, to Boeing Aircraft Company, Seattle, Wash., a corporation of Washington Application November 8, 1939, Serial No. 303,420

19 Claims. (Cl. 89—1.5)

This invention relates to bomb rack installations within aircraft. Primarily it has to do with an airplane intended for the transportation of heavy loads of bombs over long distances.

It is preferred that such long range bomb-carrying airplanes be formed as flying boats, for there is generally little difficulty in finding water areas in suitable locations which will permit the take-off and relatively slight angle of climb required for airplanes thus heavily loaded with bombs and with the necessary fuel to accomplish these long range missions, whereas such conditions are not always readily available for land type airplanes.

Since flying boats are not inherently so efficient aerodynamically as land type airplanes, it is necessary that the aerodynamic form of such an airplane be as free as possible from all drag, which requires that the bombs be carried inside the aerodynamic contours, as in an internal bomb bay, so that they may at all times be wholly protected from the air stream, and so that the surfaces of the aircraft as a whole be as smooth and continuous as possible. It is scarcely practicable to carry heavy loads of bombs under or within the wing, because material loads are then distributed at appreciable distances from the center of gravity of the airplane, and occasion considerable moments about this center. It is essential that such loads be concentrated as close as possible to the airplane's center of gravity, and these considerations require that the bombs be carried in a bomb bay within the fuselage of the aircraft, as close as possible to the airplane's center of gravity.

But it is a further design consideration that the step be located in the vicinity of the center of gravity, or close below the same, and because of this fact, and because the bottom of the hull in hydroplaning is very heavily stressed, it is impracticable to permit openings through the bottom structure, particularly in the vicinity of the step, nor so large as would be required by large bombs, for the vertical release of bombs which are carried within the bomb bay in the fuselage, close to the center of gravity. It is undesirable, as a matter of fact, to cut out or in any manner weaken the bottom structure below, that is, inside of, or even adjacent the chine line.

Previously attempts have been made to solve the problem of supporting and discharging the bombs, which must be thus carried, by supporting them upon a bomb rack which is movable outwardly through an opening in the side of the fuselage or hull, into a position within the air stream where the bombs might be dropped free, to fall vertically. For heavy bomb loads, such as such long range bombers will carry, this creates serious problems in the support of the bombs and bomb racks in such a manner as to permit their movement and their proper support when thus outwardly moved, and it introduces further problems in the proper control of the release of the bombs by selective or by salvo means, and the coordination of such release means with the movement of the bomb rack and with the movement of doors which normally close the openings. In addition the bombs and the racks, when in position for release, are projected out into the air stream where they create additional drag until they are again retracted, and they cannot be immediately retracted, wherefore at the moment of contact with the enemy, and while the airplane is probably subjected to anti-aircraft fire, the speed and maneuverability of the airplane is seriously diminished. In addition the load of bombs is thus projected outwardly from the center of gravity, and produces a disturbing moment when thus positioned or upon the release of a bomb.

Such considerations may not apply, at least to the same degree, when a single bomb only is carried upon such a bomb rack, and is thereby moved outwardly from within the fuselage to an exposed position for dropping, as has been proposed heretofore, but the purpose for which such long range bombing airplanes are constructed is not attained if the airplane is capable of carrying only a single bomb, or a single bomb at each side. If only a single bomb is carried, the airplane can well be a land-type plane, and can drop the bomb through a hole in the bottom of the fuselage. Such a long range bomber must, in practice, be capable of carrying a large number and a heavy load of bombs, and upon contact with the enemy it must be capable of releasing those bombs, selectively or in salvo, and must be capable of releasing normally only a part of its bomb load, and then, without diminution of speed or maneuverability, returning to release a further portion of its load, or of continuing on to release bombs upon a second objective. For such maneuvers it is highly important that the airplane retain to the full its utmost capabilities of speed and maneuverability, particularly during contact with an enemy, and that it be unimpeded by projecting bomb racks or slowed up by the necessity of projecting the bomb rack before bombs can be released, and of retracting the bomb rack, after discharge of bombs, before the airplane can attain its top speed.

It is the object of the present invention to devise an aircraft and a bomb rack installation for the same which will to the fullest degree permit the attainments of the objectives indicated above. In brief, it is the object of the present invention to provide a bomb-carrying airplane, and a bomb rack installation therefor, by means of which the airplane can carry a maximum load and an appreciable number of bombs, supported by bomb racks which may be of standard design, supported entirely within the fuselage at all times, and capable of discharging the bombs by standard control means for selective or salvo release, or for release of any given number at a time, through openings in the sides of the hull or fuselage, above the chine line.

Since the bombs cannot, in such an installation, be permitted initially to drop vertically free, but must be released and given a lateral component to discharge them outwardly from the openings in the sides of the hull, it is a further object to provide means which will guide the bombs, and afford them this lateral component, and which will be readily adaptable to various sizes of bombs. Associated with this object it is a further object to provide such guide means which, without damage or danger to the airplane or to the bomb, will absorb this lateral component, and in lieu thereof will give the bomb a downward component at the end of its lateral outward movement, to the end that the bomb will drop substantially vertically, and will be thereby susceptible of accurate control by the normal bomb sight and bomb releasing means, without introducing complications due to the lateral component which the bomb must have for its release through the opening in the side of the hull.

It is a further object to provide such an installation in which the openings are or may be normally closed and flush, provided with doors and with guides upon such doors which cooperate with other guide means, to the ends above, and capable of adjustment likewise to accommodate the door-carried guide means to the size of bomb which is carried by the rack.

It is also an object to provide a rack and cooperating hull-carried guide means, one or both of which are adjustable in accordance with the space available within the cross-section of the hull, the size of bomb to be carried upon a given rack, the relationship thereto of the door-carried guide, and the possibility, with the smaller sizes of bombs, of attaining an angle of roll for the bombs which approaches the permitted angle of departure from vertical in a free fall.

With the above and other objects in mind, as will appear more fully and clearly from this specification, from the drawings, and from the claims, my invention comprises the novel aircraft, and the novel bomb rack, and the novel combination of the two, all as shown in the accompanying drawings in a typical but diagrammatic form, and as will be explained more in detail in this specification, and as will be defined by the claims.

Figure 3 is a transverse section through the bomb rack installation, illustrating a bomb supported therein.

Figure 4 is a fragmentary view similar to a portion of Figure 1, showing a slightly modified arrangement of the door-carried guide means.

Figure 2:
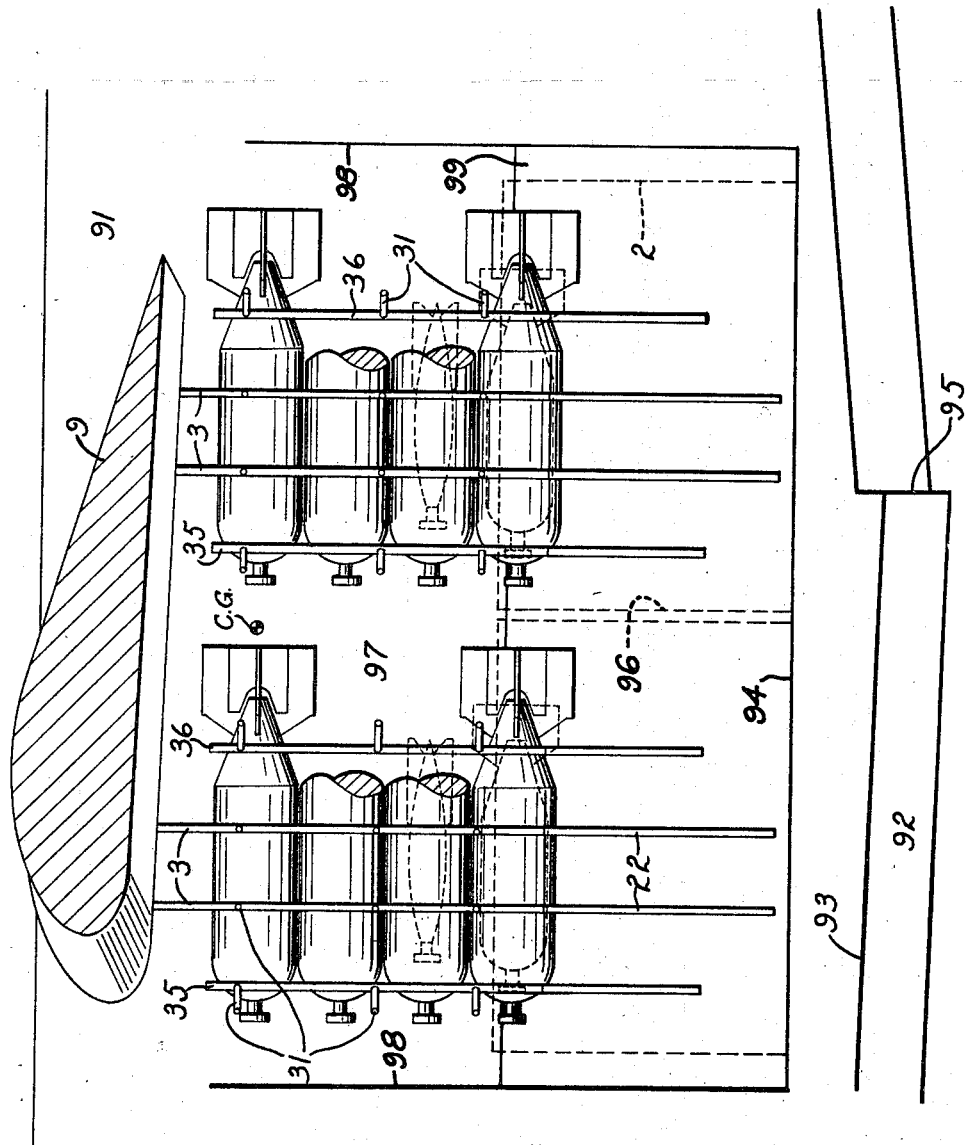
Figure 2 is a side elevation of the same, with the near side or skin of the hull omitted to show the bomb rack installation immediately within the same.

The sustaining wing is illustrated at 9, and the fuselage in general is supported therefrom. The airplane's center of gravity, loaded, is in the vicinity of the point C. G., in Figure 2, in the longitudinal medial plane. The fuselage or hull includes the sides 91, and the hydroplaning bottom 92, terminating at its rear at the step 95 and at its sides in the chines 93, where the sides 91 join the bottom. The interior of the fuselage is normally decked over internally at 94. The hull, between the deck 94 and the bottom 92, is heavily reinforced, the structural elements constituting this reinforcement being omitted from the drawings, however, since their necessity and their structure are well understood in the art. Frequently this space constitutes water-tight flotation compartments. The necessity for avoiding interrupting such structure with large opening, and for avoiding interrupting or piercing the flotation compartments in this manner, is obvious.

In the sides 91, in the vicinity of the center of gravity and of the step, and above the chine line 93, there are provided openings 96, one or more at each side, which are normally closed by doors 2. It is immaterial whether the openings 96 extend below the loaded water line, or stop thereabove, for the bomb bay to which they admit will normally be tight against entrance of water by reason of the fixed longitudinal bulkheads 99. These bulkheads 99 extend sufficiently high above the lower edge of the opening 96 that no water can ever flow or wash over them. In addition, these bulkheads 99 transmit the shear loads in the skin 91 around the large openings 96, through the transverse bulkheads 98, defining the ends of the bomb bay 97, to which bulkheads 98 the bulkheads 99 are joined. The airplane's center of gravity, approximately indicated at C. G., is located within the bomb bay.

Figure 1:
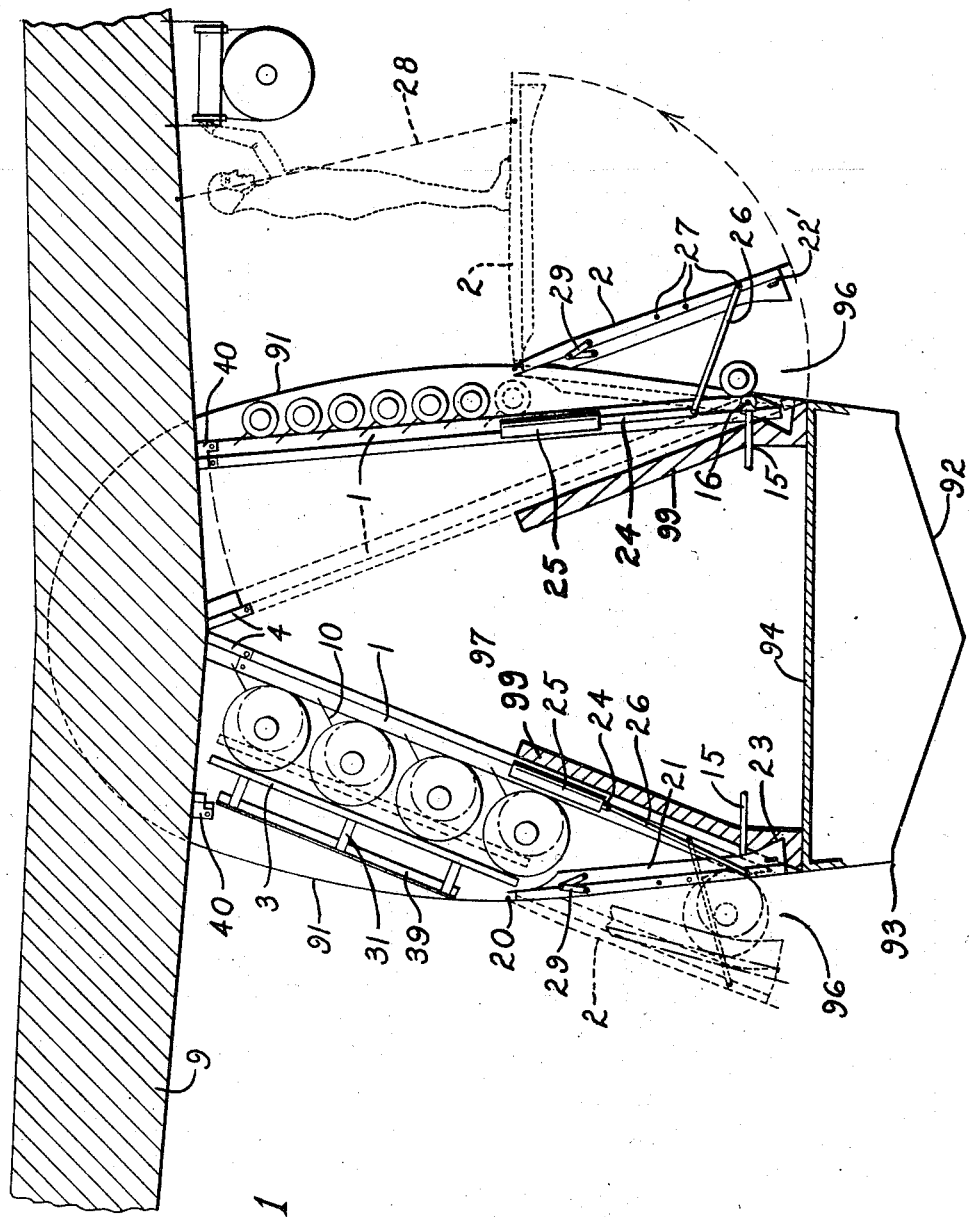
Figure 1 is in effect a transverse section through the hull or fuselage, illustrating the bomb rack installation therein, and illustrating at opposite sides the adaptability of the bomb rack and its installation to different sizes of bombs, and the adjustability of the rack and of associated guides, etc., to different conditions of use.

The doors 2 in normal flight are held closed, and so far as is practicable are then flush with the skin 91, to form a smooth, unbroken streamline continuation of the skin of the sides 91, but the doors may be moved to an open position; to such a position as is shown, for instance, at the right of Figure 1 in full lines, or at the left in dash lines, by suitable mechanism, at the proper time and under the control of an operator within the hull. To this end it is preferred that each door be hinged at 20, at its upper edge, and at the upper edge of that opening 96 which is closed by this particular door.

Within this bomb bay are provided bomb racks for the support of a plurality of bombs. Preferably each bomb rack is a multiple-station bomb rack, and since standard or normal bomb racks may be used, the details of the bomb rack have not been shown herein, other than that each bomb rack includes the customary upright rails 1, usually arranged in pairs, whereon are carried the bomb shackles, diagrammatically illustrated at 10, for the support and controlled release of the bombs, by means such as are suggested by the shaft 15, operatively connected at 16 to release mechanism upon the rack. In Figure 1 the largest size of bomb is shown in full lines at the left, the smallest size normally used with such racks is shown at the right, and an intermediate size is shown in dot-dash lines at the left. Such an installation is adapted to the support and release of any such size of bomb.

Instead of supporting the bomb racks in vertical position, so that the bombs may drop free (which in the present installation is not possible without excessive bulging of the sides, and reduced capacity, because the bombs must have a lateral component for their passage through the openings 96), the bomb rack rails 1 are disposed in an inclined position, slanting upwardly and towards the longitudinal median plane of the hull, as is best shown in Figure 1. Thus each rail 1 extends from the lower edge of the adjacent opening 96 upwardly and inwardly. In this position it supports its bombs precisely as in the normal installation, wherein the rails are vertical, with the bombs lying against the rails 1, but when the shackle 10 releases the bomb, the bomb commences to roll or slide down the rails 1.

In order to confine the bombs, and to guide them in their rolling or sliding, and so that they will be accurately delivered or discharged to the opening 96, I provide cooperating guide rails 3, preferably arranged in pairs, opposite and parallel to the rails 1, as may be seen in Figure 3. Since the installation must be capable of taking the various sizes of bombs, either the rails 3 or the rails 1 should be adjustable with relation to the other, and I prefer that the rails 3 be adjustably mounted. Any convenient means to this end may be employed. As is best shown in Figure 3, each rail 3 is carried upon transverse arms 30, guided in sleeves 31 which are fixedly supported from the aircraft structure in such manner that the guide rails 3 and their arms 30 may slide inwardly and outwardly, or towards and from the rails 1, with the rails 3 always parallel to the rails 1. Actually, it is preferred that the sleeves 31 be all carried by a removable frame or frames 39, for reasons which will shortly appear.

I prefer that the adjustment of the rails 3, relative to their frame 39, or relative to the aircraft structure, be manually accomplished, although that is largely a matter of indifference. To accomplish this adjustment and to hold the parts in properly adjusted position I may provide the through pins 32 receivable in registering holes in the sleeve 31 and in the arm 30, the whole being held in adjusted position by a pivoted cross head 33 upon the pin 32, and a spring 34. The sleeve 31 and arm 30 may be provided with cooperating index marks (not shown) to indicate the size of bomb for which the rack is adjusted in any given position.

Since the bomb, in some instances, might have or acquire a component forwardly or rearwardly, when released, I prefer that there be provided also rails 35 and 36, positioned to engage the nose and tail ends, respectively, of at least the larger sizes of bombs, which latter rails are adjustable to accommodate them to different sizes of bombs, whereby the bombs may not move forwardly nor rearwardly to any appreciable extent while rolling or sliding down the guide rails 1. In this rolling they are restrained, against the lateral component, primarily by the cooperating pairs of rails 3, and secondarily by the rails 35 and 36. These latter rails, 35 and 36, absorb some of the lateral component, as well as any longitudinal component, and indeed might be used alone, with the rails 3 omitted. The rails 35 and 36 may be supported and adjusted by means analogous to those described with reference to the rails 3, as is shown in Figure 3.

The pairs of rails 1 and 3, or 1 and 35, 36, cooperate to guide a bomb to the corresponding opening 96, where, of course, the door 2 has been swung aside to permit the bomb to pass through the opening. However, in order to guide the bomb further until it is entirely through the opening and ready to drop free, and further to absorb the lateral component necessarily given the bomb by its movement down the inclined rack 1, and to direct it vertically downward, we provide guide means in the nature of pairs of rails 21 on the interior of each door 2, which further guide means in effect are continuations of the rails 3, and cooperate with the rails 1, to the ends just stated. The rails 21 are shown upon the inside of the door 2 in Figure 1. They may be fixed upon the door, so that there may be a minimum of necessary adjustments, but preferably are adjustably held by toggle links 29, as will appear hereafter. At the lower end each rail 21 is curved inwardly, as is indicated at 23, this serving to engage each bomb just before it finally drops free, to absorb from the bomb any lateral component, and to direct the bomb substantially vertically downwardly.

While the door may always be opened so fully, and the rails 21 may be held in such position of adjustment, relative to the door, that the rails 21 will primarily engage and accommodate only the largest size of the bomb, throughout its fall, and others by the part 23 only at the end of their fall, this is not desirable. Normally parts will be so positioned that, by swinging of the door open to a greater or less degree, and by proper adjustment of the rails 21 relative to the door, they will engage and effect the direction of smaller sizes of bombs throughout their downward movement, as may be seen in the several positions illustrated in full lines, in dash lines, and in dot-dash lines, in Figure 1, and as seen in Figure 4. The proper positioning of the door, to accommodate the size of bomb carried by the rack, may be accomplished by connecting the plunger 24 of the door opening and closing cylinder 25, fixed within the hull, to the door by means of a link 26 of greater or lesser length, connected at any one of several points of engagement, as indicated by the holes at 27. Indeed, the link 26 may readily be disconnected from the door, and the entire door may then be swung upwardly, as is shown in dash lines at the right of Figure 1, where it can be suported by a cable 28, to permit the support and adjustment beneath the wing 9 of a torpedo, when desired.

The proper positioning of the rails 21 may be accomplished in the manner best indicated in Figure 4, where the rail 21, corresponding to the rail 22, is mounted adjustably upon and relative to the door 2, the adjustment being accomplished by such means as the toggle links 29, whereby to maintain the rail 21 in alignment with the rail 3 at all times, or at least in the plane defined by the rails 3.

Since the bomb rack rails 1, or any downward extension thereof, must terminate at or above the lower edge of the opening 96, the roughly triangular space available for carrying bombs is limited, on the outer side, by the cross-sectional contour of the hull, and on the inner side by the slope of the rails 1. If the hull bulges appreciably the available space is thereby increased, or the rails 1 may be more nearly vertically placed. Vertically placed bomb racks are desirable, but (omitting the possibility of an exaggeratedly bulged side, or an outwardly curved bomb guide below the rack, neither of which is desirable) is scarcely fully attainable in a situation where, as here, the bombs must have some lateral outward component to project them through the opening 96 in the side. Nevertheless, the smaller the departure of the bomb rack rails from vertical, so long as they are sufficiently inclined to give to the bombs the minimum necessary lateral component, the better, insofar as structural and safety considerations are concerned. Minimum departure of the rails 1 from the vertical is naturally desirable with large size bombs, which, if given large lateral outward momentum by inclined rails, must, to avoid sighting errors, lose that lateral momentum by engagement with structure such as 23 which changes its partly lateral movement into wholly downward movement, with consequent stress due to the large momentum of the heavy bomb. On the other hand, since the triangular available space narrows towards the bottom of the rack, there must be a compromise between a minimum bulging of the sides 91 and a minimum vertical angle of the rails 1, to afford sufficient space between them for the required number of the largest size bombs. The rails 1, as shown, are appreciably inclined from the vertical.

As has been indicated, it may suffice merely to open the door 2 slightly less for intermediate size bombs, without adjustment of the rails 21 relative to the door. The advantage of this is that it simplifies and reduces the number of necessary adjustments, and by so much reduces the possibility of personal errors, such as overlooking and failing to accomplish some such adjustment. The intermediate bombs then will not be engaged by the rails 21 until the bombs approach the bottom of the rails 1; indeed, the bombs may engage or strike only the guide portions 23. This is not entirely desirable, yet because the structure, including the elements 23, is made sufficiently rugged to resist the momentum of the largest bombs, it may and probably would be sufficiently strong to resist the lesser momentum, even the shock, of being struck by the intermediate bombs. It is therefore not outside the boundaries of the invention to mount the rails 21 solidly upon the door, or to hold them against the door, without adjustment, positioning the elements 23 to engage the size of bomb being carried by proper opening of the door 2 more or less, as required. However, it is preferred that the rails 21 be adjustable in position for the intermediate size of bomb, to engage each bomb throughout its downward movement. As has been indicated above, since the door 2 may swing open to a greater or lesser degree, thereby determining the position of the lower end of the rails 21 and of the curved guides 23, only the upper end of the rails 21 need be adjustable relative to the door, as by toggle links 29 of proper length, the rails being pivotally mounted upon the door at 22', at their lower end.

The same plan of adjustment may be followed for the smallest size of bomb, or, so far as structural considerations are concerned, no adjustment of the rails 21 need be made at all, since structure that will resist the momentum of the largest bombs will unquestionably contain and guide the smallest bombs. It is the matter of impact and quick rebound that becomes serious with the smallest bombs, and it has been found desirable to avoid any contact of the smallest bombs with the rails 21 or the door 2. This can be done by shifting the bomb rack itself to a nearly vertical position, as shown in full lines at the right in Figure 1.

The space available for the bombs, in the angle between the bomb rack rails 1 and the side 91, is sufficient, when the bombs are of the smallest size, even though the rack is nearly vertical, whereas with larger bombs the space would be insufficient, without greater bulging of the side 91. With the bomb rack positioned nearly vertically, the lateral component given to the bombs sliding or rolling down the rails 1 is slight, as compared to that given to bombs by a less vertically disposed rack, yet it is sufficient that they will clear the opening 96 and the chine 93, though insufficient to require compensation in sighting, being of a magnitude less than other possible and uncontrollable sources of error. The smallest bombs, with the bomb rack placed so nearly vertically, may be dropped without attempting to absorb their slight lateral component, wherefore the door 2 is merely opened sufficiently widely that the bombs will not strike it, and adjustment and operation are by so much simplified.

To enable such adjustment of the inclination of the bomb rack, its upright rails 1 are pivoted at the lower edge of the opening 96, along the lengthwise axis 16, and their upper ends are pinconnected, or otherwise simply and removably secured, to alternative brackets 4 or 40, mounted within the hull. It should be noted that the bomb release mechanism, represented in part at 15, operates mechanically from a bombardier's station upon the airplane to the shackles 10 through the hinge axis 16 of the rack itself. It is therefore possible to effect release of bombs—salvo or emergency release, for instance—positively by mechanical means, even after failure of a normal electrically controlled release system, regardless of the position of adjustment of the rack.

For loading the bombs the doors 2 are swung open and held, as by the cable 28, and the bombs are then hoisted by an internal winch or hoist from a dock or tender alongside the hull, upwardly along the rack 1 to proper position, where they are secured and supported by the shackles 10 in the usual manner. The guide rails 3 are then or previously adjusted to the proper size, and if the door-carried rails are adjustable, as they are normally, these two are adjusted to the proper size of bomb. The proper link 26 is properly adjusted also to accord with the size of bomb, and the proper toggle links 29, and the door is closed.

Thus closed the airplane presents a smooth, unbroken, continuous streamline surface, affording the maximum of speed, efficiency, and maneuverability. Upon arrival adjacent its objective it is only necessary to swing the doors 2 open, and at the proper time to release the bombs in whatever manner is required by the circumstances, or permitted by the controls installed. If it is desired to circle and release additional bombs, there is nothing projecting into the air stream except the doors 2, which do not materially affect the speed nor the maneuverability of the airplane.

The bombs, as they are released by the shackles 10, roll or slide down the bomb rack rails 1, and they are guided by these rails and by the cooperating rails 3 to the opening 96, and are guided by the bomb rack rails 1 and in most cases by the cooperating door-carried rails 21 through the opening 96, and finally are directed downwardly by the inwardly curved end portion 23, and downward. By this time the bomb is clear of the side 91 and clear of the chine 93, wherefore it may be permitted to drop vertically free, and thus dropping it is subject to as accurate control as is normally accomplished by the use of the regular bomb sight.

The airplane's mission accomplished, the doors 2 are swung shut, and the airplane is again a streamlined, highly efficient aerodynamic body, capable of maximum performance in the return flight to its base.

What we claim as our invention is:

1. A bomb-carrying aircraft comprising a fuselage enclosing a bomb bay, having an opening adjacent the lower portion of its side for discharge of bombs, a multiple-station bomb rack and upright guide rails parallel to and spaced from the bomb rack, both inclined upwardly and inwardly from the opening for the support of bombs and for their guidance to the opening upon their release, a door for closing said opening, and hingedly mounted by its upper edge to the upper edge of the opening, for outward swinging, and guide means carried by the door, supplementing the previously mentioned guide means, to guide bombs through the opening and into the clear.

2. A bomb-carrying aircraft comprising a fuselage enclosing a bomb bay, having an opening adjacent the lower portion of its side for discharge of bombs, a bomb rack and guide means spaced therefrom, both disposed within the bomb bay and generally above the opening, for the support of bombs, and for the guidance thereof, following release, to the opening, a door for closing said opening, mounted for opening movement, and further guide means associated with and positioned by movement of the door into open position, for engagement by a bomb after the latter has passed beyond certain of the previously mentioned bomb-guiding means, to guide the bomb through the opening and into the clear.

3. A bomb-carrying aircraft comprising a fuselage enclosing a bomb bay, having an opening adjacent the lower portion of its side for discharge of bombs, a bomb rack and guide means spaced therefrom, both disposed within the bomb bay and generally above the opening, for the support of bombs, and for the guidance thereof, following release, to the opening, a door for closing said opening, mounted for opening movement, further guide means associated with and positioned by movement of the door into open position, for engagement by a bomb after the latter has passed beyond certain of the previously mentioned bomb-guiding means, to guide the bomb through the opening and into the clear, and means for adjusting the bomb-guiding means to accommodate varying sizes of bombs.

4. A bomb-carrying aircraft comprising a fuselage enclosing a bomb bay, having an opening adjacent the lower portion of its side for discharge of bombs, a bomb rack and guide means spaced therefrom, both disposed within the bomb bay and generally above the opening, for the support of bombs, and for the guidance thereof, following release, to the opening, a door for closing said opening, mounted for opening movement, further guide means associated with and positioned by movement of the door into open position, for engagement by a bomb after the latter has passed beyond certain of the previously mentioned bomb-guiding means, to guide the bomb through the opening and into the clear, and means for adjusting the internal guide means towards and from the bomb rack, to accommodate varying sizes of bombs, and means adjustable to vary the extent of the door's opening, thereby to position those guide means which are associated with the door in position corresponding to any given position of the internal guide means.

5. A bomb-carrying aircraft comprising a fuselage enclosing a bomb bay, having an opening adjacent the lower portion of its side for discharge of bombs, a bomb rack and guide means spaced therefrom, both disposed within the bomb bay and generally above the opening, for the support of bombs, and for the guidance thereof, following release, to the opening, a door for closing said opening, mounted for opening movement, and further guide means associated with and positioned by movement of the door into open position, for engagement by a bomb after the latter has passed beyond certain of the previously mentioned bomb-guiding means, to guide the bomb through the opening and into the clear, the several bomb-guiding means being disposed and formed to afford to the bomb a lateral component, as it is discharged, to direct it outwardly from the opening in the fuselage.

6. A bomb-carrying aircraft comprising a fuselage enclosing a bomb bay, having an opening adjacent the lower portion of its side for discharge of bombs, a bomb rack and guide means spaced therefrom, both disposed within the bomb bay and generally above the opening, for the support of bombs, and for the guidance thereof, following release, to the opening, a door for closing said opening, mounted for opening movement, and further guide means associated with and positioned by movement of the door into open position, for engagement by a bomb after the latter has passed beyond certain of the previously mentioned bomb-guiding means, to guide the bomb through the opening and into the clear, the several bomb-guiding means being disposed and formed to give to the bomb an initial lateral component, as it is discharged, to direct it outwardly through the opening, and a final downward component after it has cleared the opening.

7. A bomb-carrying aircraft comprising a fuselage enclosing a bomb bay, and having an opening at each side, adjacent its lower portion, for the discharge of bombs, multiple-station bomb racks within the bomb bay, each including two upright rails inclined upwardly and inwardly towards the vertical median plane from the lower edge of the respective openings, two guide rails parallel to and spaced from the bomb rack rails, inclined upwardly and inwardly from the upper edge of the opening, a door hinged at the upper edge of the opening to close the opening, and swingable outwardly for discharge of the bombs, the guide rails and the bomb rack rails cooperating to guide a released bomb to the opening, for discharge therethrough, and further guide rails carried by the door, in position to cooperate with the bomb rack rails, after the released bomb has passed below the first-mentioned guide rails, in guiding the bomb through the opening.

8. A bomb-carrying aircraft comprising a fuselage enclosing a bomb bay, and having an opening at each side, adjacent its lower portion, for the discharge of bombs, multiple-station bomb racks within the bomb bay, each including two upright rails inclined upwardly and inwardly towards the vertical median plane from the lower edge of the respective openings, two guide rails parallel to and spaced from the bomb rack rails, inclined upwardly and inwardly from the upper edge of the opening, a door hinged at the upper edge of the opening to close the opening, and swingable outwardly for discharge of the bombs, the guide rails and the bomb rack rails cooperating to guide a released bomb to the opening, for discharge therethrough, and means supporting the guide rails from the fuselage independently of said bomb racks and bomb rack rails, and adjustable to vary their spacing from the bomb rack rails, to accommodate varying sizes of bombs.

9. A bomb-carrying aircraft comprising a flying boat hull having generally upright sides, and having openings in its sides, above the chine line and in the vicinity of the step, for discharge of bombs from an internal bomb bay, bomb racks within the bomb bay for the support and for the release at will of bombs, and guide means primarily within the hull, but including elements which are retracted, in normal flight, within the streamline contour of the hull, and which are movable outwardly into the air stream, said outwardly disposed guide means being engageable with released bombs to guide them to and through the openings, for discharge.

10. A bomb-carrying airplane comprising a fuselage enclosing a bomb bay, and having an opening in its side for the discharge of bombs, a releasable bomb-supporting means within the bomb bay, means within the bomb bay to give a lateral outward component to the bomb released from said bomb-supporting means, to project the bomb laterally through said opening, and means carried upon the fuselage and disposed outwardly of the opening, for engagement by such released bomb after it has cleared the opening, to absorb such lateral component, and to direct the bomb downwardly.

11. A bomb-carrying airplane comprising a fuselage enclosing a bomb bay, and having an opening in its side for the discharge of bombs, a bomb rack within the bomb bay, including a stationary bomb support operable to release a bomb to fall freely therefrom through the bomb bay, and rails inclined from said support downwardly and outwardly to the lower edge of the opening serving as guides down which a freely falling bomb released from said support, rolls or slides, to give the bomb a lateral component to clear the opening, and means to hold the rails in a plurality of positions of different inclination, to vary the lateral component thereby given to a bomb when it is released.

12. A bomb-carrying airplane comprising a fuselage enclosing a bomb bay, and having an opening it its side for the discharge of bombs, a bomb rack within the bomb bay, including rails inclined from the lower edge of the opening upwardly and inwardly as guides down which a bomb rolls or slides, and is thereby projected laterally through the opening, a door normally closing said opening, means to move the door aside to permit such projection and dropping of a bomb, and means carried by the door, and positioned by movement of the door to a definite open position, to engage a bomb after the latter has cleared the opening, and to absorb its lateral component and to direct the bomb again downwardly, with a minimum lateral component.

13. A bomb-carrying airplane comprising a fuselage enclosing a bomb bay, and having an opening in its side for the discharge of bombs, a bomb rack within the bomb bay, including rails inclined from the lower edge of the opening upwardly and inwardly to define, with the adjacent side of the fuselage, a generally triangular bomb-containing space, and means to adjust the angularity of the bomb rack rails about the lower edge of the opening, and the spacing of its upper end from the adjacent side of the fuselage, thereby to adjust the effective size of the bomb-containing space.

14. A bomb-carrying aircraft comprising a fuselage enclosing a bomb bay having an opening adjacent the lower portion of its side for discharge of bombs, a multiple-station bomb rack within the bomb bay including stationary suspending means releasably holding each bomb individually, guide rails engaging the inner sides of said bombs held by said bomb rack, extending therebelow to said opening, and generally inclined slightly from vertical, the lower ends of said guide bars being disposed outwardly of the upper ends, and means operable to release said individual bomb suspending means separately or simultaneously to enable said bombs to fall freely through the bomb bay guided by said rails, for discharge through said opening.

15. A bomb-carrying aircraft comprising a fuselage enclosing a bomb bay having an opening adjacent the lower portion of its side for discharge of bombs, a multiple-station bomb rack within the bomb bay including stationary suspending means releasably holding each bomb individually, guide rails engaging the inner sides of said bombs held by said bomb rack, extending therebelow to said opening, and generally inclined slightly from vertical, the lower ends of said guide bars being disposed outwardly of the upper ends, means operable to release said individual bomb suspending means separately or simultaneously to enable said bombs to fall freely through the bomb bay guided by said rails, for discharge through said opening, and means disposed laterally outward from the side of said fuselage for engagement by the freely falling bombs after discharge through said opening for deflecting the bombs from a downward and outward course to a directly downward course with substantially unimpeded movement.

16. A bomb-carrying airplane comprising a fuselage enclosing a bomb bay, and having an opening in its side for the discharge of bombs, a bomb rack within the bomb bay, including rails engageable by such bombs for directing them through such opening in the side of the fuselage, and means to adjust the angularity of the bomb rack rails relative to the side of the fuselage, thereby changing the position of bombs engaging said rails relative to the opening in such fuselage side.

17. A bomb-carrying aircraft comprising a fuselage enclosing a bomb bay having an opening in its side for the discharge of bombs, a stationary bomb-supporting means within the bomb bay operable to release a bomb to fall freely through the bomb bay, and guide rails spaced apart laterally, engageable simultaneously with both the inner and outer sides of such freely falling bomb released from said bomb-supporting means, a guide rail engageable with the inner side of the bomb being constructed and arranged to give a lateral outward component to such a bomb, to project the bomb laterally through said opening, and a guide rail engageable with the outer side of the bomb extending uninterruptedly through and beyond the opening a distance sufficient for continuous guiding engagement with the outer side of the bomb until it has passed completely through the opening.

18. A bomb-carrying aircraft comprising a fuselage enclosing a bomb bay having an opening in its side for the discharge of bombs, a stationary bomb-supporting means within the bomb bay operable to release a bomb to fall freely through the bomb bay, guide rails spaced apart laterally, engageable simultaneously with both the inner and outer sides of such freely falling bomb released from said bomb-supporting means, a guide rail engageable with the inner side of the bomb being constructed and arranged to give a lateral outward component to such a bomb, to project the bomb laterally through said opening, and a guide rail engageable with the outer side of the bomb extending uninterruptedly through and beyond the opening a distance sufficient for continuous guiding engagement with the outer side of the bomb until it has passed completely through the opening, and deflecting means at the lower end of such outer guide rail engageable with the bomb after its discharge through the opening, thereby to deflect it positively from its lateral and downward direction of movement through the opening to a substantially vertically downward direction.

19. A bomb-carrying aircraft comprising a fuselage enclosing a bomb bay having an opening adjacent the lower portion of its side for discharge of bombs, a bomb rack including means for suspending a bomb within the bomb bay and releasable to enable the bomb to fall freely through the bomb bay, and parallel guide rails spaced apart laterally and inclined downwardly and outwardly from said suspending means to said opening, engageable simultaneously with both the inner and outer sides of such freely falling bomb released from said means to and through said opening, a guide rail engageable with the outer side of the bomb extending uninterruptedly through and beyond the opening a distance sufficient for continuous guiding engagement with the outer side of the freely falling bomb during its movement along the inclined path defined by said guide rails until it has passed completely through the opening.

RICHARD H. NELSON.
THOMAS A. ENDRES.
RICHARD L. STITH.